Aug. 24, 1937.   R. F. HOFLIN   2,090,758
BATTERY PLATE SEPARATOR
Filed Oct. 28, 1933

Inventor
Richard F. Hoflin
C. F. Haden
By
Attorney

Patented Aug. 24, 1937

2,090,758

UNITED STATES PATENT OFFICE 2,090,758

BATTERY PLATE SEPARATOR

Richard F. Hoflin, Randolph, Mass., assignor to James H. Malone, Wollaston, Mass.

Application October 28, 1933, Serial No. 695,707

1 Claim. (Cl. 136—146)

This invention relates to separators for storage battery plates and process of making them.

A primary object of the invention is to provide a thin porous separator for battery plates which has great mechanical strength and which will retain its shape and not warp or split when dry.

Another object of the invention is to provide a separator of this character which is uniform in texture thruout having no knots, checks or shakes, and which will resist the process of oxidation and hydrolysis to a much greater degree than the wood now used for this purpose.

A further object is to so construct such a separator that its mechanical strength will not be affected to any appreciable degree by increasing acid concentration, temperature and time of immersion.

Still another object is to so construct a wooden battery plate separator that all trimming, candling, unit packing, mineral salt and soluble matter removing will be eliminated.

Another object is to so construct a battery plate separator that batteries equipped with them may be shipped and kept in bone dry condition until ready for use whereby a new standard of power, life and dependability of the battery so equipped will be established.

Another object of the invention is to provide a battery plate separator constructed from a cold molded synthetic wood composition which is first subjected to pressure and formed into blocks and said blocks sliced to form the individual separators.

Another object is to so construct a plate of this character that the proper porosity will be produced to permit the passage of the battery acids therethru.

Figure 1:
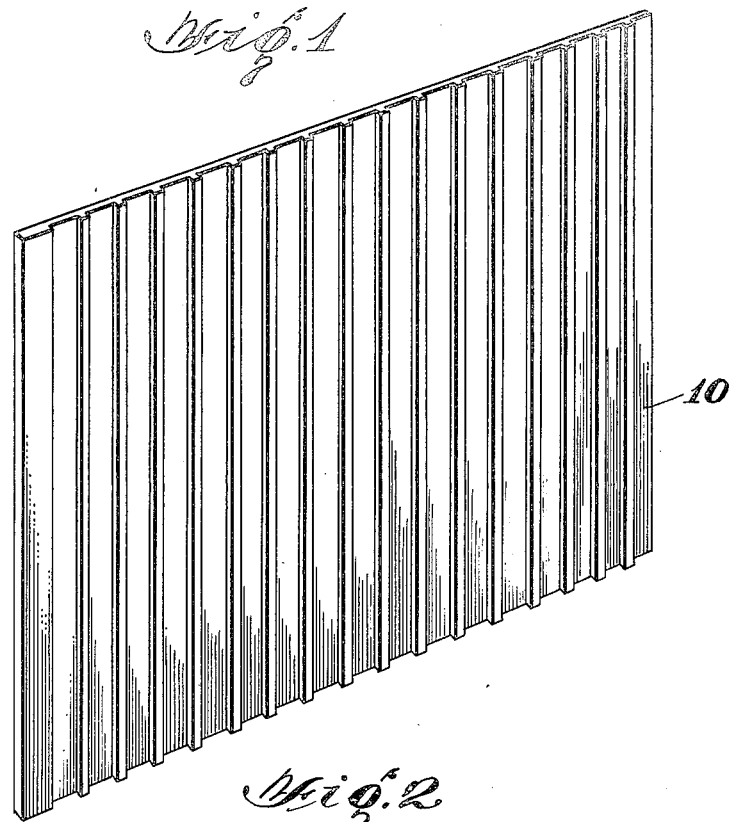
Figure 2:
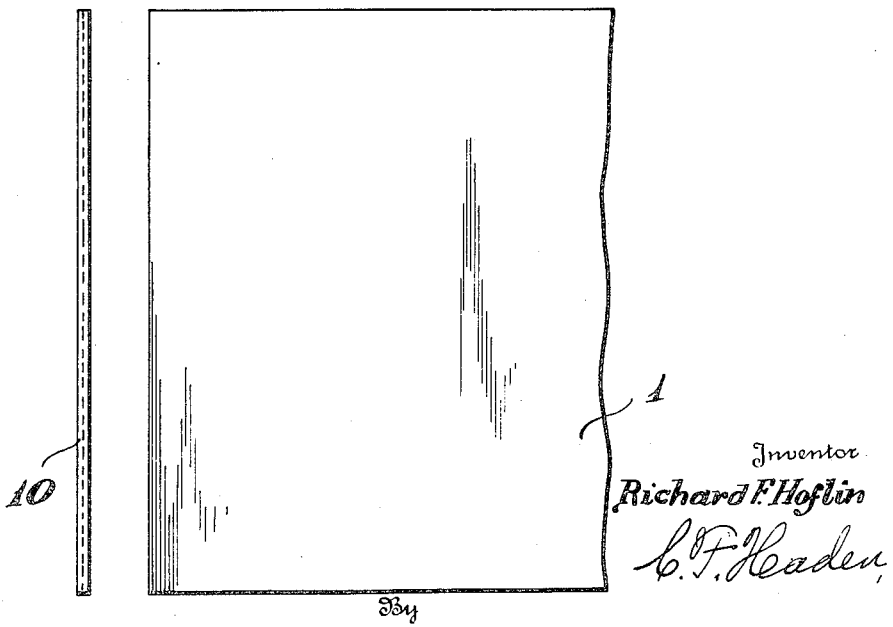

In the accompanying drawing Figure 1 represents a perspective view of the plate separator constituting this invention; and Fig. 2 is a side elevation, with parts broken off, of the block from which the separator is formed with one of the separators shown in juxtaposition as it is cut therefrom.

The battery plate separator constituting this invention comprises a sheet 10 sliced from a molded block of synthetic wood shown at 1, the sheet being of the requisite thickness for a separator of this character and grooved as is customary. This sheet 10 is preferably grooved simultaneously with the slicing operation by a suitable knife and is immediately ready for use.

The block of stock 1 from which the sheet or separator 10 is divided is molded from a suitable composition under pressure into the size and shape necessary to produce by slicing sheets 10 therefrom ready for use as battery plate separators without requiring any trimming, candling, unit packing or other treatment such as is now necessary with separators made from natural woods.

The stock block 1 is composed of synthetic wood made from a cold composition composed of the following ingredients, in substantially the proportions given:

| | Parts by weight |
|---|---|
| Cedar wood flour | 25 |
| Alcohol soluble casein | 20 |
| Cedar or fir wood fiber | 10 |
| Binder | 45 |

The binder is preferably composed of 15 parts by weight of solvent, preferably ethyl alcohol; 12 parts by weight Manilla copal and shellac in equal parts.

To every 100 pounds of the dry material are preferably added 10 pounds of cotton flocks so that when said separator is subjected to an acid bath the flocks has a carbonizing effect and thus gives additional porosity to the plate separator.

The ingredients above enumerated are placed in a kneading machine and after treating from 1 to 2 hours the composition is ready for molding under a pressure of 80 pounds to the square inch, more or less.

The synthetic wood block 1, formed as above described, while porous will yet have great mechanical strength so that the sheets or separators 10 sliced therefrom will be sufficiently porous to permit the battery acids to pass therethru and yet be very strong. A separator 10 so formed will not warp or split when dry, will have a uniform texture thruout and will resist the process of oxidation and hydrolysis to a much greater degree than those made from natural woods, which latter are subject to knots, checks and shakes and must be candled to avoid them, as well as trimmed, unit packed and treated to remove mineral salts and other soluble matter contained in the sap of the wood used.

Moreover, these separators constructed in accordance with this invention, due to the fact that they will not warp or split when dry, permit batteries to be equipped with them and shipped dry without the usual acid solutions thereby greatly reducing the weight of the batteries and the consequent cost of shipment. Also due to the fact that the batteries equipped with these plate separators do not require the acid solutions to be placed therein until the batteries are to be used, greatly increases the power, life and dependability of the battery.

I claim as my invention:

A material for making battery plate separators composed of the following named ingredients in the proportions designated: 25 parts by weight of cedar wood flour, 20 parts by weight of alcohol soluble casein, 10 parts by weight of cedar wood fiber and 45 parts by weight of binder substance.

RICHARD F. HOFLIN.